3,632,751
METHOD OF REMOVING ODOR FROM NYSTATIN
James Ling Chen, East Brunswick, N.J., assignor to E. R. Squibb & Sons, Inc., New York, N.Y.
No Drawing. Filed Mar. 13, 1969, Ser. No. 807,102
Int. Cl. A61k 21/00
U.S. Cl. 424—123       5 Claims

ABSTRACT OF THE DISCLOSURE

The musty odor which frequently remains after the production of the antibiotic nystatin is removed by treating the substance with sulfur dioxide or a metal sulfite.

DESCRIPTION OF THE INVENTION

The production of the antibiotic nystatin frequently yields a product in which there is a residual musty odor due to the presence of certain unknown volatile impurities. This musty odor is objectionable and creates a problem in the formulation of both oral and topical preparations in which the antibiotic is dispensed. A relatively high proporton of perfume or other fragrant substance is required in the formulation under such circumstances to mask the odor.

It has now been found that the unidentified odor causing substances and the objectionable odor may be removed by treating the nystatin during the course of its normal processing with sulfur dioxide or a metal sulfite. The sulfur dioxide may be passed in gaseous form through a batch of the antibiotic during the processing or purification stages, e.g., during the final slurry of nystatin with water before centrifuging to remove water soluble impurities. After the sulfur dioxide treatment the suspension is centrifuged and the residue is washed again with water until the wash water is free of odor of sulfur dioxide.

Similarly, an aqueous suspension of nystatin may be treated with a metal sulfite. These metal sulfites, preferably in the form of a water soluble salt, may contain the sulfite ion in the form of the bisulfite, metabisulfite or hydrosulfite. Any water soluble metal salt may be used, but the alkali metal sulfites, especially the sodium salt, are preferred, most especially sodium bisulfite. The treated material is then washed with water to remove the treating agent.

When a metal sulfite is used, the nystatin is suspended in water and the pH is adjusted within the range of about 4.5 to 6.0, e.g., with citric or phosphoric acid. The aqueous suspension is treated with a solution of the metal sulfite at a rate of about 0.05 to 2.0 gm., preferably about 0.1 to 0.5 gm., per 100 gm. of antibiotic. Gentle heating, not over 50° C., may be helpful in accelerating the removal of the impurities. The suspension is then filtered and the nystatin is washed free from bisulfite with water.

Alternatively, sulfur dioxide gas may be passed into or through a batch of nystatin during the processing or purification stages to achieve the same result. For example, the gas may be introduced through a distributing device into a tank or vessel containing the nystatin while the antibiotic is suspended in water for final slurrying and washing. The gas may be introduced until about 1 to 5 mg. of sulfur dioxide has been absorbed for each kilogram of nystatin in suspension. The treatment may be repeated if necessary.

The nystatin does not lose potency by the deodorization treatment.

The following examples are illustrative of the invention.

EXAMPLE 1

0.2 gram of sodium bisulfite is dissolved in approximately 200 ml. of purified water. 100 grams of nystatin are suspended in the solution with mixing. The pH of the suspension is adjusted to approximately 6 with citric acid. Gentle heat is applied, but the temperature is not permitted to exceed 50° C. The suspension is stirred continuously for one-half hour. The slurry is centrifuged to remove the water and the residue is washed repeatedly with 500 ml. of water at a time until the wash water is free from the odor of sulfur dioxide.

EXAMPLE 2

Ten kilos of nystatin are suspended in 20 liters of purified water with constant agitation in a closed tank. While the agitation is continued, sulfur dioxide gas is slowly bubbled in through the bottom of the tank until 25 gms. of sulfur dioxide have been absorbed. The pH of the suspension is maintained between 5 and 6, adjusting with phosphoric acid if necessary. Agitation is continued for one-half hour. The mixture is then centrifuged and the residue is continuously washed with purified water until the wash water is free from the odor of sulfur dioxide.

What is claimed is:

1. A method for deodorizing nystatin which comprises adding to an aqueous suspension of nystatin at a pH of about 4.5 to 6 and at a temperature up to about 50° C. about 0.05 to 2 gm. of metal bisulfite, metabisulfite or hydrosulfite per 100 gm. of antibiotic, filtering the suspension and washing the residue with water.

2. A method as in claim 1 wherein the metal sulfite is alkali metal bisulfite, alkali metal metabisulfite or alkali metal hydrosulfite.

3. A method as in claim 1 wherein the metal sulfite is sodium bisulfite.

4. A method as in claim 3 wherein about 0.2 to 2.0 gm. of sodium bisulfite per gm. of nystatin is used to treat the nystatin in aqueous suspension.

5. A method for deodorizing nystatin which comprises adding to an aqueous suspension of nystatin at a pH of about 4.5 to 6 and at a temperature up to about 50° C. about 1 to 5 mg. of sulfur dioxide per kilogram of antibiotic, filtering the suspension and washing the residue with water.

References Cited
UNITED STATES PATENTS 2,832,719   4/1958   Vandeputte _____ 424—123
2,865,807   12/1958   Dutcher et al. _____ 424—123

STANLEY J. FRIEDMAN, Primary Examiner
D. M. STEPHENS, Assistant Examiner

U.S. Cl. X.R.
424—120